United States Patent [19]
Brooks et al.

[11] Patent Number: 5,185,881
[45] Date of Patent: Feb. 9, 1993

[54] USER REPAIRABLE PERSONAL COMPUTER

[75] Inventors: Charles J. Brooks; Gary H. Gregg, both of Kennewick, Wash.

[73] Assignee: Marcraft International Corporation, Kennewick, Wash.

[21] Appl. No.: 581,563

[22] Filed: Sep. 12, 1990

[51] Int. Cl.⁵ .................. G06F 11/00; G06F 11/16
[52] U.S. Cl. ........................ 395/575; 364/231; 364/269.2; 364/944; 364/945.5; 364/DIG. 1; 364/DIG. 2; 371/8.1; 371/9.1
[58] Field of Search ............ 395/575; 364/231, 269.2, 364/944, 945.5; 371/8.1, 9.1, 16.1, 16.2; 361/380, 392

[56] References Cited

U.S. PATENT DOCUMENTS

| | | | |
|---|---|---|---|
| 3,170,071 | 2/1965 | Griesmer et al. | 371/8.1 |
| 3,517,171 | 6/1970 | Avizienis | 371/8.1 |
| 3,519,808 | 7/1970 | Lawder | 371/8.1 |
| 3,818,199 | 6/1974 | Grossmann et al. | 371/11.3 |
| 4,456,966 | 6/1984 | Bringol et al. | 364/900 |
| 4,501,460 | 2/1985 | Sisler | 361/380 |
| 4,718,064 | 1/1988 | Edwards et al. | 371/16.2 |
| 4,754,397 | 6/1988 | Varaiya et al. | 361/380 |
| 4,811,275 | 3/1989 | Balogh, Jr. et al. | 364/900 |
| 4,960,388 | 10/1990 | Frantz et al. | 439/610 |
| 5,013,262 | 5/1991 | Shibano | 439/610 |
| 5,020,999 | 6/1991 | Dewitt et al. | 439/328 |
| 5,035,652 | 7/1991 | Shibano | 439/610 |
| 5,047,708 | 9/1991 | Kondner, Jr. | 371/16.2 |

OTHER PUBLICATIONS

IBM Technical Disclosure Bulletin V. 17, No. 4, Sep. 1974.
IBM Technical Disclosure Bulletin V. 27, No. 9, Feb. 1985.

*Primary Examiner*—Charles E. Atkinson
*Attorney, Agent, or Firm*—Wells, St. John & Roberts

[57] ABSTRACT

A preferred embodiment of the user repairable personal computer described for enabling a novice user to repair of personal computer without having to send the unit to a service facility. The computer 10 has a plurality of modules contained within a main chassis 20, such as a power supply module 44, a system board module 50, a plurality of disc drive modules 72-76, a disc drive adapter card module 84 and a video controller card module 94. The computer 10 further has peripheral modules in the form of a video display module 16 and a keyboard module 18. The system board module 50 has a microprocessor integrated circuit device 54 and a plurality of supporting memory IC current devices 56 and imput/Output IC circuit devices 58. A plurality of the IC circuit devices is removably mounted to pin sockets 60. Additionally the system board module 50 has pluarlity of status wires 66 that are operationally connected to a front panel 22 of the chassis by a front panel status connector 160. The set 66 of wires has one end permanently electrically connected to the printed circuit board 52. The connector 160 has a keying means 161 for preventing the connector for being incorrectly assembled and a latching means 167 for preventing unintentional disconnection. Any defective module may be easily disconnected, removed and replaced with a "good" module with minimum chance that an incorrect replacement or reconnection will be made.

33 Claims, 12 Drawing Sheets

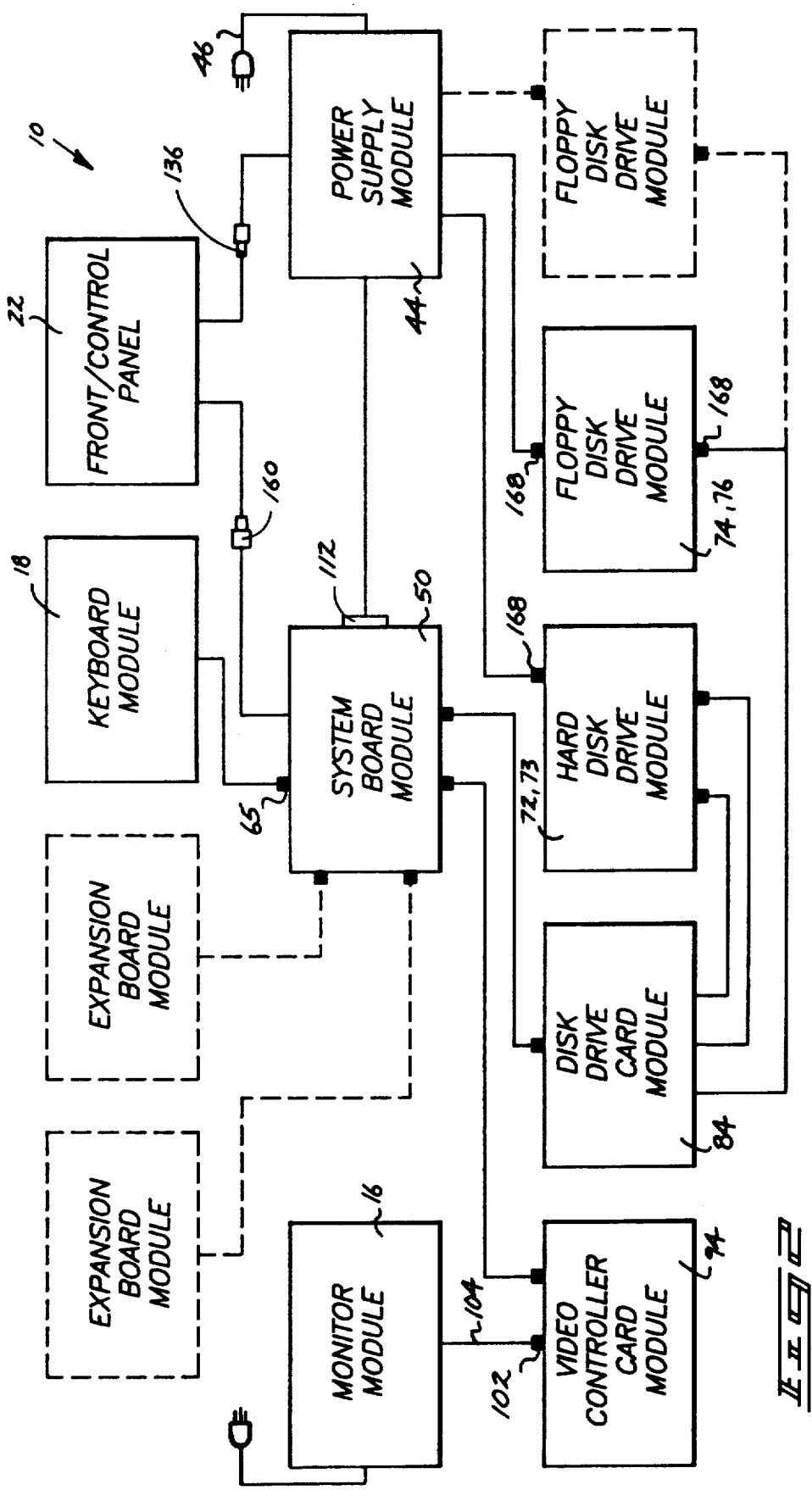

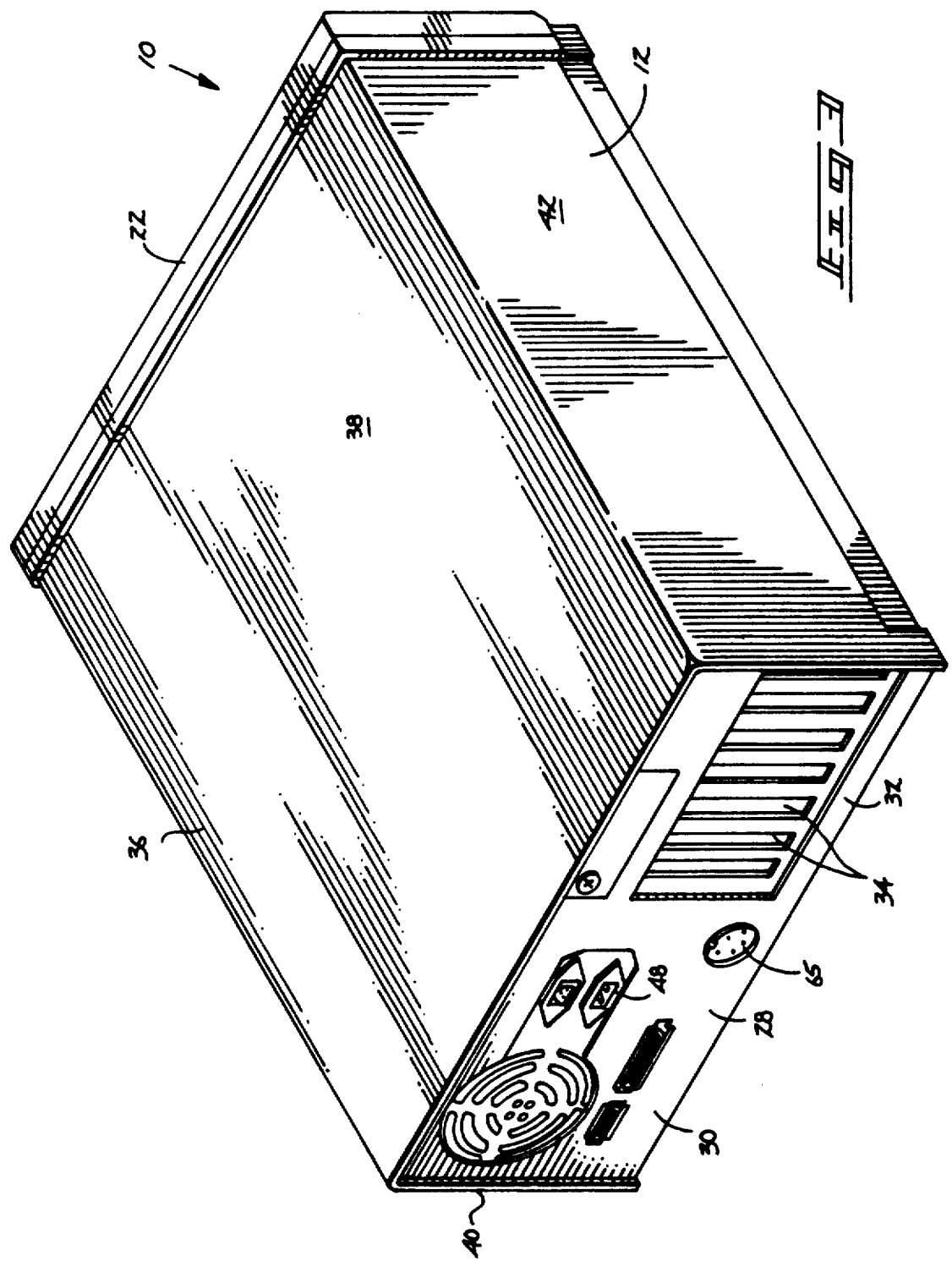

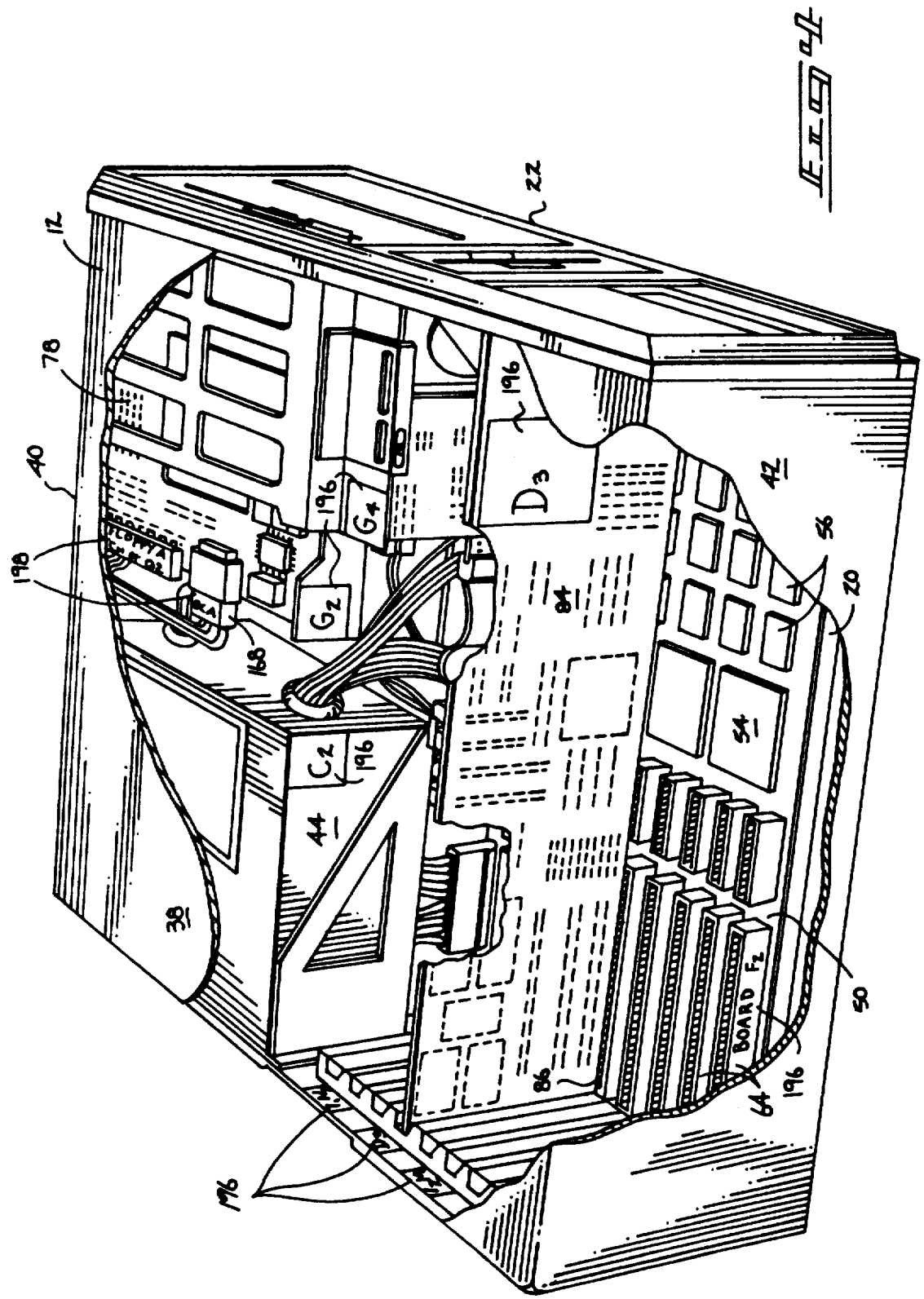

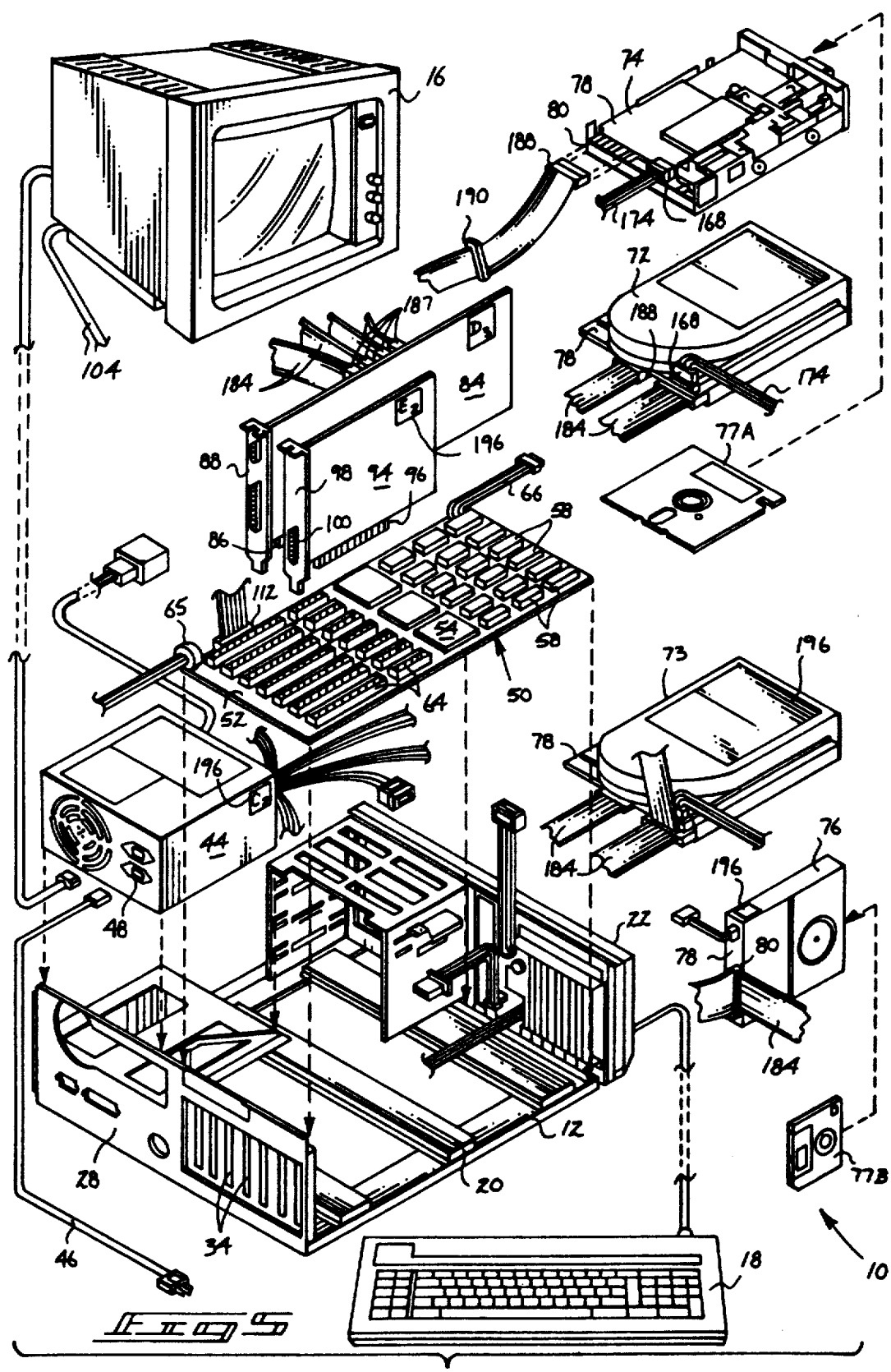

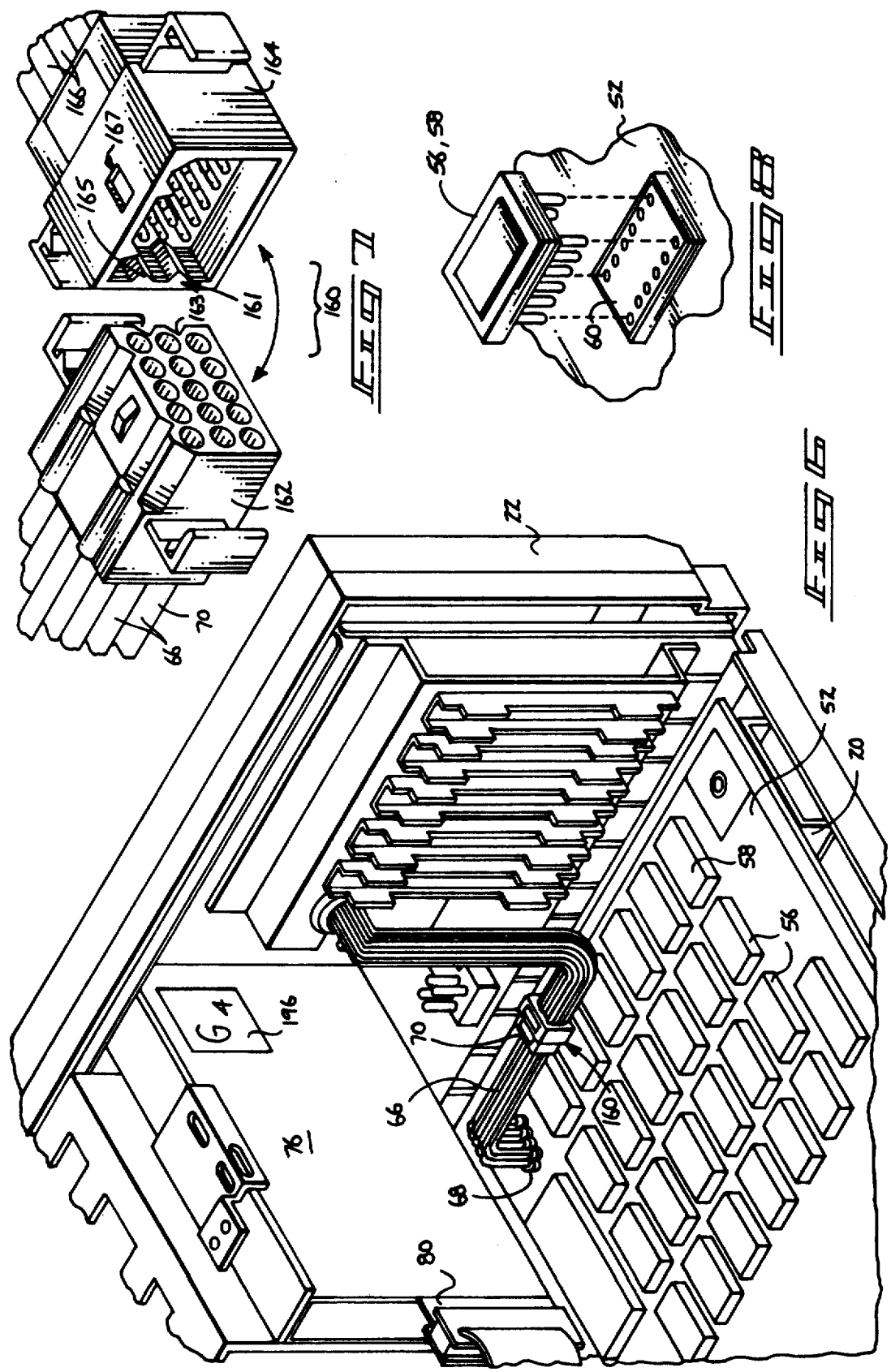

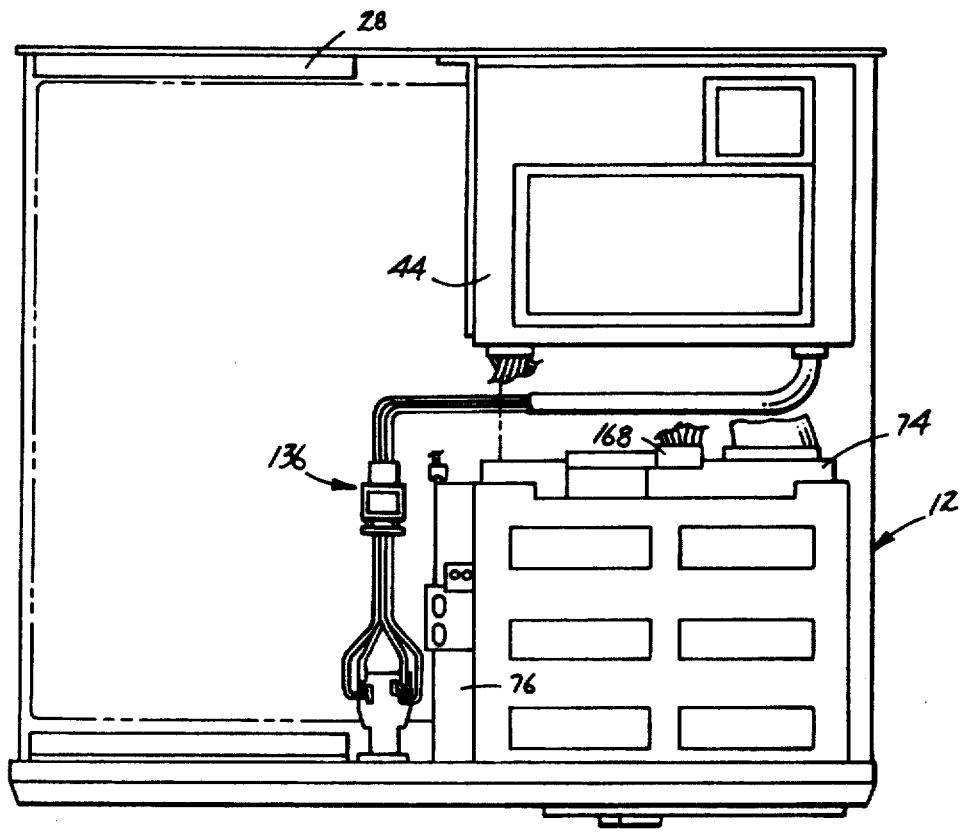
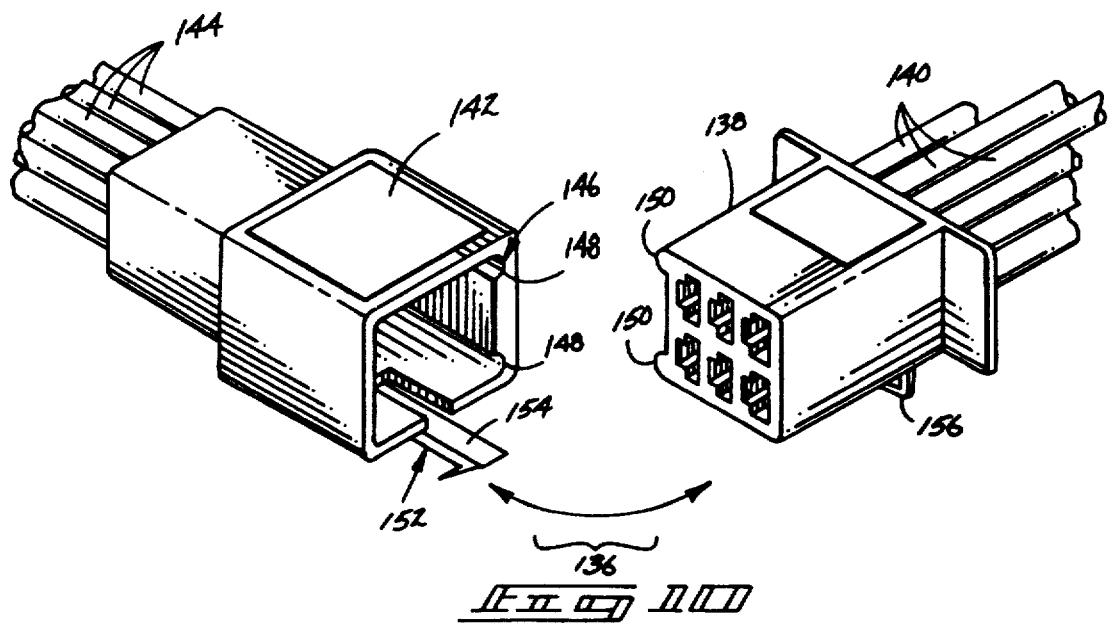

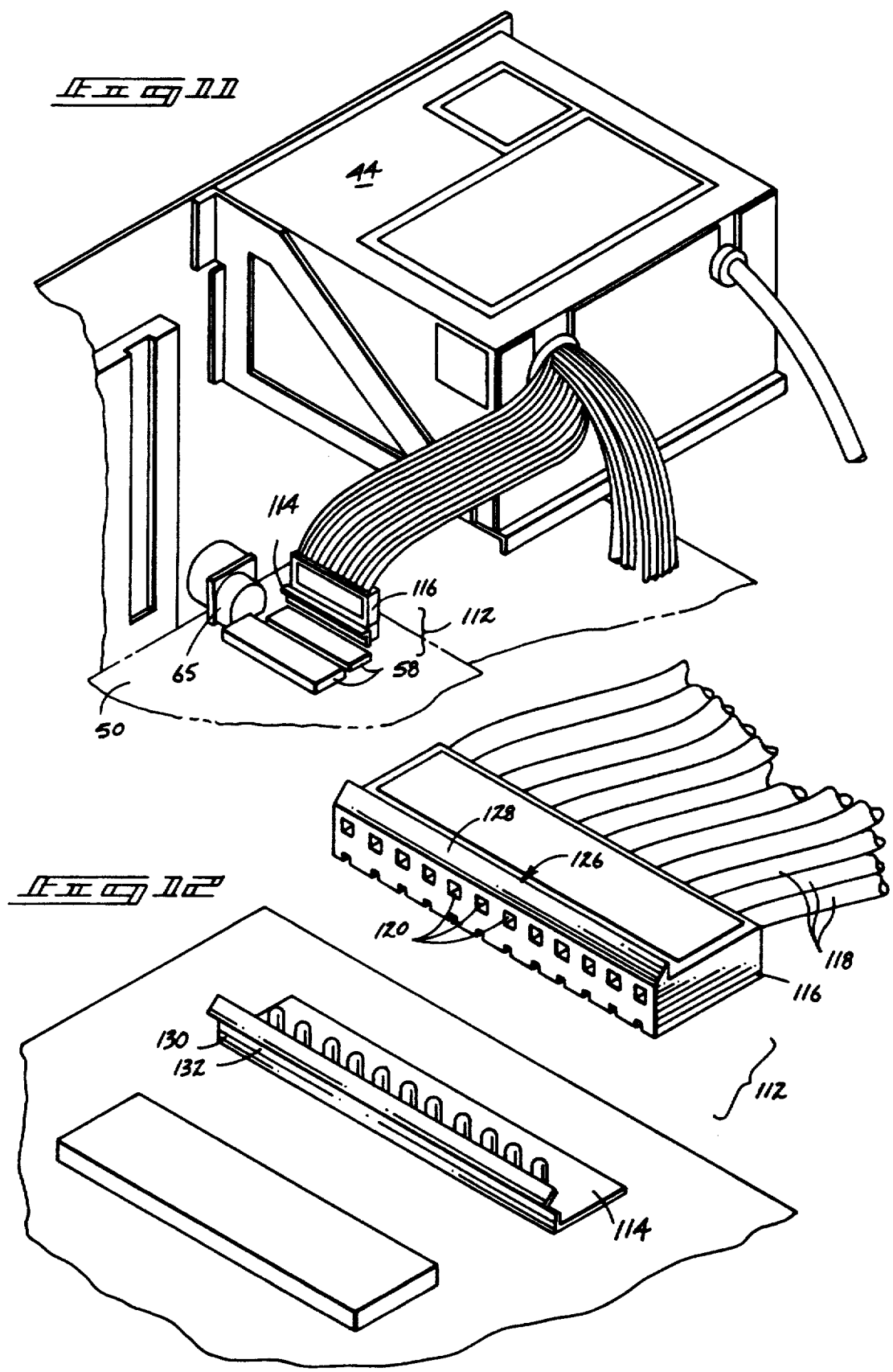

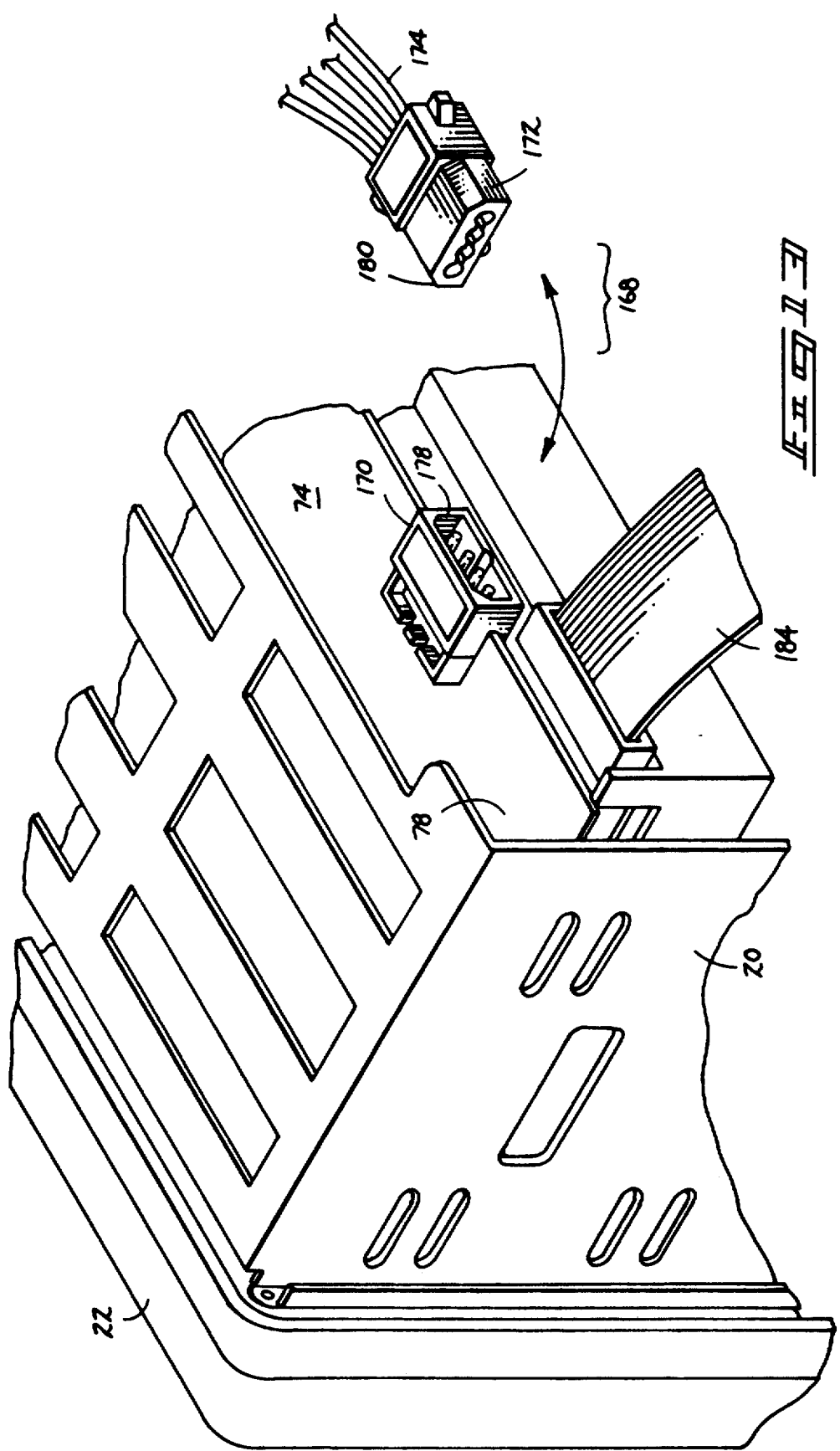

| MODULE | LETTER CODE | MODULE | LETTER CODE |
|---|---|---|---|
| Keyboards (A) | | System Boards (F) | |
| 101-Key | A2 | 8088 5/10MHz | F1 |
| | | 80286 10/16Mhz | F2 |
| Monitors (B) | | 80386 20/25Mhz | F3 |
| Monochrome | B1 | Floppy Disk Drives (G) | |
| Color | B2 | | |
| EGA | B3 | 360K-byte | G1 |
| VGA | B4 | 1.2M-byte | G2 |
| Multi Sync | B5 | 720K-byte | G3 |
| | | 1.44M-byte | G4 |
| Power Supplies (C) | | | |
| | | Hard Disk Drives (H) | |
| 150 Watt | C1 | | |
| 200 Watt | C2 | 20M-byte | H1 |
| 220 Watt | C3 | 40M-byte | H2 |
| Disk Drive Ctrllers (D) | | Multi I/O Cards (I) | |
| 360K Floppy | D1 | 8-bit | I1 |
| 20M Hard Drive | D2 | 16-bit | I2 |
| Hard/Floppy | D3 | | |
| | | Memory Expansion (M) | |
| Video Controllers (E) | | | |
| | | Modems (N) | |
| Mono/Graphic | E1 | | |
| Color/Graphic | E2 | 2400 bps | N2 |
| Enhanced Color | E3 | | |
| VGA | E4 | | |

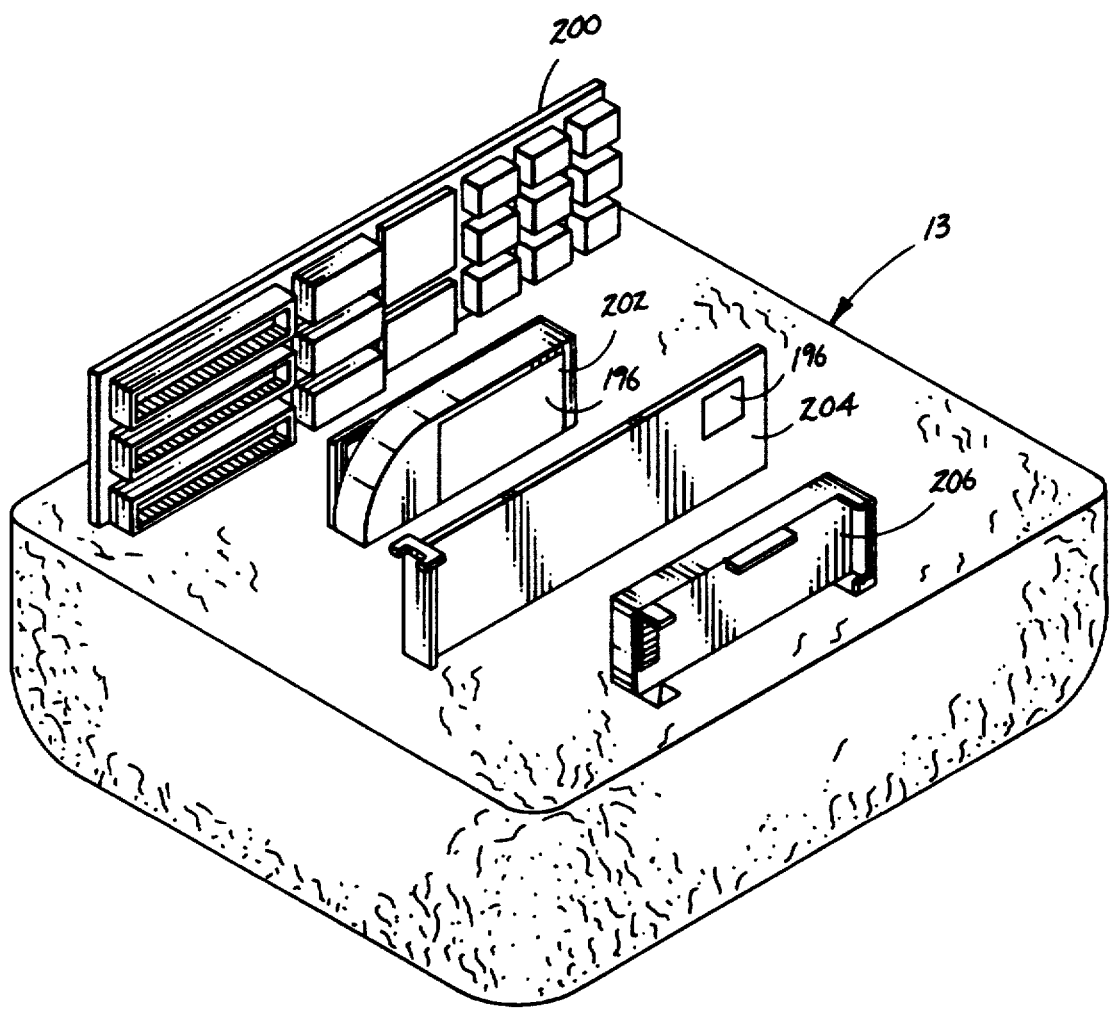

USER REPAIRABLE PERSONAL COMPUTER

TECHNICAL FIELD

This invention relates to user repairable personal computers.

BACKGROUND OF THE INVENTION

The repair of a malfunctioning or "downed" personal computer presents a particularly perplexing problem. Almost invariably, a properly trained and highly skilled electronic technician is required to properly diagnose the malfunctioning personal computer and to make the necessary repairs. Generally such a skilled technician is located some distance from the location of the defective personal computer requiring the user to remove the personal computer from its location of use, detach the video monitor and keyboard from the main unit, package the main unit, and deliver or ship it to the location of the skilled repair technician. Some personal computer manufacturers have regional service centers where such malfunctioning personal computer may be sent for repair. In some countries there are no service centers, particularly in developing and underdeveloped countries. Other manufacturers require that the personal computer be send back to the factory. Not only is such a repair process inconvenient, but it also invariably involves a substantial turn around time. Probably most importantly, however, it involves lost productivity by the user.

Some manufacturers offer "service contracts" in which users are able to purchase rather quick repair service by a skilled technician. However, such "service contracts" are expensive.

One of the principal objects and advantages of this invention is to provide a personal computer that can be repaired by a novice user without the necessity of having to use a trained and skilled electronic technician. Essentially the personal computer may be repaired by a lay person.

BRIEF DESCRIPTION OF THE DRAWINGS

The preferred embodiment of the invention is illustrated in the accompanying drawings, in which:

FIG. 2 is an illustrative block diagram of major modules of the personal computer shown in FIG. 1 emphasizing the interconnections between the major modules, in which optional modules are illustrated in dotted line;

FIG. 3 is an isometric rear corner view of a main chassis of the personal computer;

FIG. 4 is an isometric side view of the main chassis with much of the housing broken away to reveal the location of the major modules within the chassis and the interconnecting wiring;

FIG. 5 is an isometric exploded view of the major modules of the personal computer;

FIG. 6 is a fragmentary isometric view of the rear of a front panel of the chassis and a system board module illustrating the interconnecting wiring and front panel status connector;

FIG. 7 is a enlarged view of the front panel status connector interconnecting the wiring between the system board module and the front panel;

FIG. 8 is an enlarged fragmentary exploded view of an integrated circuit socket mounted on a printed circuit of the system board module for removably receiving an integrated circuit package;

FIG. 9 is a top view of the main chassis with the cover removed illustrating a front panel power connector between the front panel and a power supply module;

FIG. 10 is an enlarged view of the front panel connector interconnecting the wiring between the front panel and the power supply module;

FIG. 11 is a fragmentary isometric view of the power supply module and a portion of the system board module illustrating a system board power connector;

FIG. 12 is an enlarged view of the system board power connector electrically interconnecting the system board module with the power supply module;

FIG. 13 is an enlarged fragmentary isometric view of a floppy disc drive module illustrating a power supply connector interconnecting the floppy disc drive module to the power supply module;

FIG. 16 is a table illustrating the letter code associated with the various modules in assisting the user to easily determine the location of each of the modules; and FIG. 17 is an exploded isometric view of a kit containing replacement modules.

DETAILED DESCRIPTION OF THE PREFERRED EMBODIMENTS

The following disclosure of the invention is submitted in furtherance with the constitutional purpose of the Patent Laws "to promote the progress of science and useful arts" (Article 1, Section 8).

Figure 1:
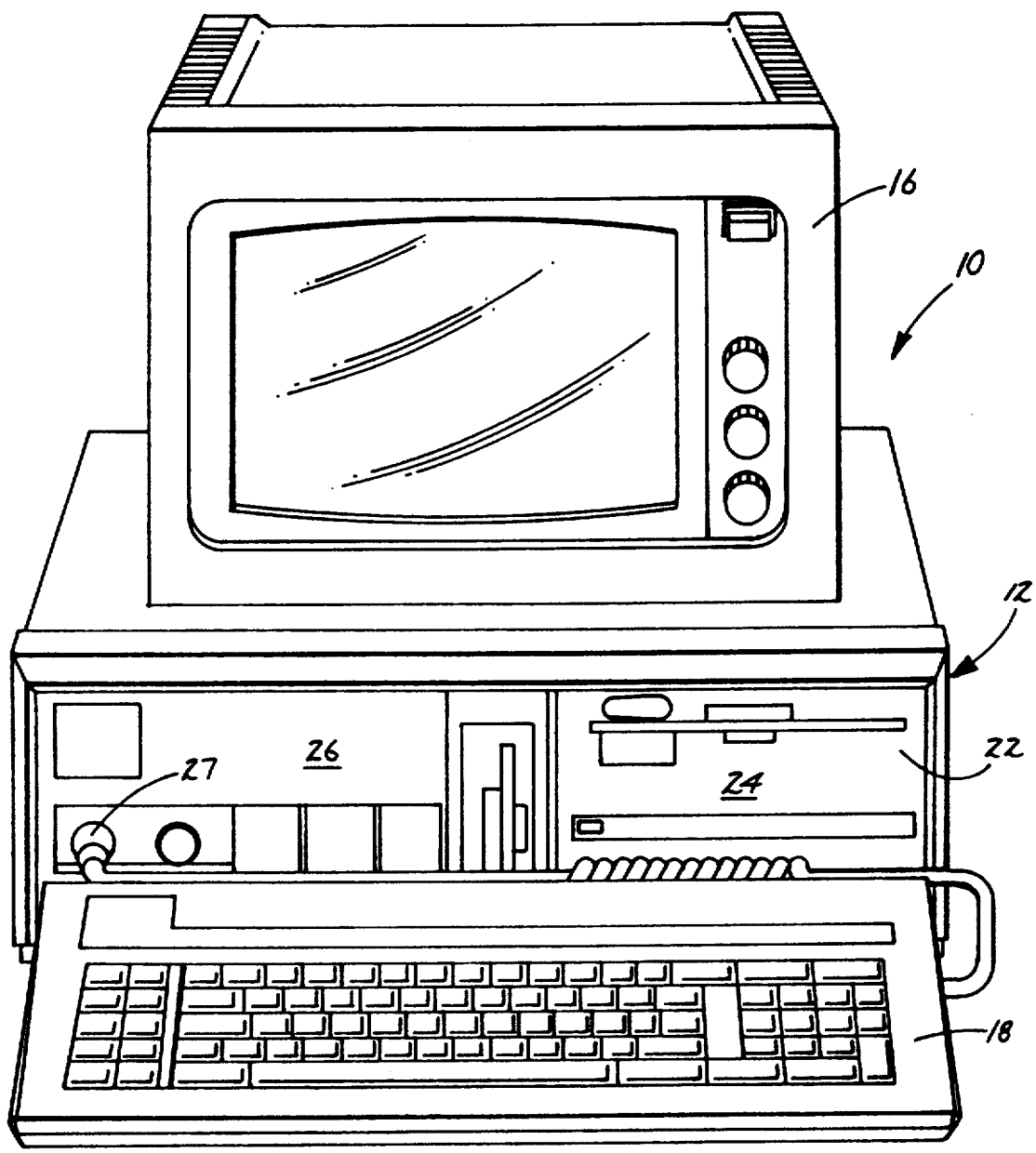
FIG. 1 is an isometric front view of the exterior of a personal computer of the preferred embodiment.

Referring in detail to the drawings, there is illustrated in FIG. 1 a user repairable personal computer assembly generally designated with the numeral 10 that is specifically constructed to enable and facilitate its repairability by the user without having to send the computer back to the manufacturing plant or to a service facility. The personal computer assembly 10 includes a main chassis 12, a plurality of peripheral modules that are operatively connected to the main chassis 12 and a replacement kit 13 (FIG. 17). In the computer assembly 10 illustrated in FIG. 1, the peripheral modules include a visual display module (video display monitor) 16 and a user input module (keyboard) 18. A wide variety of other peripheral modules may be attached to the main chassis 12, including a printer, a mouse, a modem and the like.

The main chassis 12 includes a base frame 20 (FIGS. 4-6 and 13) having a front control and display panel 22. The front panel 22 includes a disc section 24 for receiving mass memory devices and an adjacent control and display section 26. In the embodiment illustrated, the front panel includes a keyboard cable socket 27.

The base frame 20 further includes a rear panel 28 (FIGS. 3, 5 and 9) that includes a power supply section 30 and an adapter board slot section 32 that includes a plurality of vertical adjacent slots 34 having slot covers mounted within the slots when the slots 34 are unused. The main chassis 12 further includes a chassis cover 36 having a top wall 38 and side walls 40 and 42.

The computer assembly 10 further includes a power supply module 44 that is mounted within the main chassis 12 for supplying a variety of DC power signals to the various electronic module components. Generally the power supply module 44 generates DC voltages of +12 volts, −12 volts, +5 volts and −5 volts. Generally, the power supply module 44 is connected to a power cable 46 (FIGS. 2 and 5) through a power cable connector 48. For portable computers such as lap top or notebook computers, the input power to the power supply module 44 may be from a battery.

The computer assembly 10 includes a system board module 50 that is mounted within the main chassis 12 that includes a major portion of the electronic components such as the central processing unit (CPU), program memory, temporary memory registers and various input/output devices.

Specifically, the system board module 50 includes a rather extensive printed circuit board 52 that is replaceably secured to the base frame 20. Generally, the printed circuit board 52 is mounted in a horizontal orientation with respect to the base frame 20.

The system board module 50 includes a microprocessor integrated circuit 54 that is preferably selected from a group consisting of the Intel families, designated as 8080, 80286, 80386 and 80486. The personal computer generally includes microprocessors that operate on an 8-, 16-or 32-bit bus.

The system board module 50 further includes a plurality of memory integrated circuit devices 56 and a plurality of input/output integrated circuit devices 58. The printed circuit board 52 includes a plurality of dual in-line (DIP) sockets 60 for receiving dual in-line (DIP) IC devices 56, 58 containing a plurality of the memory integrated circuit devices 56 and input/output integrated circuit devices 58. The circuit devices 56 and 58 are removably mounted to the sockets 60 to enable defective circuit devices 56, 58 to be replaced once the module 50 is removed and replaced.

The module 50 further includes adapter card edge connector sockets 64 that are aligned with the respective slots 34 for receiving adapter card modules. Additionally, the system board module 50 includes a keyboard cable socket 65 that is capable of receiving a keyboard cable plug. In the specific embodiment illustrated, the keyboard cable may be plugged into either the keyboard cable socket 27 on the front panel or into the keyboard cable socket 65 mounted on the system board module 50 adjacent to the rear panel. If the keyboard cable is mounted in the keyboard cable socket 27 in the front panel 22, then a set of jumper cables is provided to extend from the socket 27 to the socket 65.

One of the important features of this invention is that the system board module 50 includes a set 66 of status wires (FIGS. 5 and 6) that have ends 68 permanently affixed and soldered to the printed circuit board 52. The set 66 further has ends 70 that extend from the board for connection to the front panel 22. It is common in non-user repairable personal computers to have a plug mounted on the printed circuit board, usually in the form of multiple "Berg" pin plugs for connecting to the front panel. However, with such an arrangement it is very easy to incorrectly connect the front panel to the "Berg" pin plugs.

The computer assembly 10 further includes hard disc drive modules 72 and 73 and floppy disk drive modules 74 and 76. Generally the hard disc drive modules 72 and 73 are either 20 M-byte or 40 M-byte hard drive disc modules. The floppy disc drive modules 74, 76 generally receive 360 K-byte, 1.2 M-byte, 760 K-byte, or 1.44 M-byte floppy disc 77. For example, floppy disc drive module 74 is shown to receive 5-¼-inch floppy discs 77a and the floppy disc drive module 76 is shown to receive 3-½-inch floppy discs 77b (FIG. 5).

Each of the modules 72, 73, 74 and 76 include individual printed circuit boards 78 having male edge connector elements 80 for connecting with other circuits of the computer.

The computer assembly 10 further includes a disc drive controller card module 84 that is mounted within the chassis 12 for operatively interfacing with the modules 72-76 for communicating between the modules 72-76 and the system board module 50. The disc drive controller card module 84 includes an edge connector element 86 that mounts in one of the adapter card edge connector sockets 64 on the printed circuit board 52. The disc drive controller card module 84 includes a mounting bracket 88 for mounting the card module in one of the slots 34 with the card removably attached to the rear panel 28.

Additionally, the computer assembly 10 includes a video controller card module 94 for interfacing between the visual display module 16 and the system board module 50. The module 94 includes an edge connector element 96 that is removably mounted in one of the adapter card edge connector sockets 64 mounted on the system printed board 52. The module 94 includes a mounting bracket 98 for removably securing the module 94 at one of the slots 34 to the rear panel 28. The module 94 includes a cable connector socket 100 mountable in the rear panel 28 for receiving a visual display module connector cable 104.

A number of other adapter card modules may be mounted in the remaining adapter card edge connector sockets 64 depending upon the desired configuration and the other peripherals that may be connected to the main chassis 12, such as a mouse, a modem, or a printer. Furthermore, additional memory capability may be added by adding additional memory modules in the unused slots 34.

The computer assembly 10 includes a power supply connector 112 (FIGS. 11 and 12) for interconnecting the power supply module 44 and the system board module 50. The connector 112 includes a female socket 114 affixed to the system board module 50 preferably adjacent to the power supply. Preferably the female socket is an in-line 12-pin socket for receiving a corresponding male plug component 116. The male plug component is a single unit that includes corresponding 12 pins for supplying DC power from the power supply module 44 to the system board module 50. The connector 112 includes a set of power supply wires 118 that have the male connector component 116 affixed to one end thereof. The connector 112 includes both a keying means and a latching means. The latching means is generally designated with the numeral 126 for latching the male and female components 116 and 114 together to prevent their inadvertent or unintentional disconnection to assist the user in correctly replacing either a defective power supply module 44 or a defective system board module 50. Specifically, the latching means 126 preferably includes a shoulder 128 formed on the male connector component 116 and a ledge 130 formed on the female socket 114. The female socket includes a flexible wall section 132 that includes the ledge 130 formed on the socket 114 so that once the male connector component 116 is inserted into the female socket 114 the wall section 132 flexes to latch the shoulder 128 in place with respect to the latching ledge 130.

The keying means 120 is produced by the offset placement of the pin receptacle holes 122 in the male connector component 116. Thus the user is unable to insert the component 116 in a reverse orientation because the receptacle holes 122 are not centered but are offset to enable connection in just one orientation.

Additionally, the computer assembly 10 includes a front panel power connector 136 that is shown in more detail in FIGS. 9 and 10. The connector 136 includes a male connector plug 138 which is affixed to the end of a set 140 of power supply wires. A female connector plug 142 is connected and affixed to the end of a set 144 of front panel wires. The front panel power connector 136 includes a keying means 146 for preventing the plugs 138 and 142 from being improperly connected. The keying means 146 includes a groove(s) 148 formed in the female connector plug 142 and ridge(s) 150 formed on the male connector plug 138 so that the plugs 138 and 142 may be connected in only one orientation to prevent incorrect connection between the set 140 of power supply wires and the set 144 of front panel wires. Such a feature greatly enhances the ability of the user to replace a faulty power supply module 44 and replacing it with a non-defective replaceable unit from the kit 13 in a very easy and fail safe procedure.

Additionally, the front panel power connector 136 includes a latching means generally designated with the numeral 152 for removably latching the plugs 138 and 142 together to prevent their inadvertent or unintentional disconnection. The latching means includes a clasp 154 that is carried by and spring biased with respect to the female connector plug 142. A ledge 156 is formed on the male connector plug 138 for receiving the clasp 154 to secure the two plugs 138 and 142 together. To release the latching means 152, the user merely biases the clasp 154 from the ledge 156 and pulls the two plugs 138 and 142 apart.

Additionally the computer assembly 10 includes a front panel status connector 160 that operatively interconnects the front panel 22 with the system board module 50. Specifically, the front panel status connector 160 is illustrated in more detail in FIG. 7. The connector 160 has a male mating plug 162 affixed to the ends 70 of the set of wires 66 and a female mating plug 164 affixed to a set 166 of front panel status wires. The connector 160 has keying means 161 comprised of grooves 163 and ridges 165 formed on the sides of the plugs 162, 164 for preventing incorrect mating. Also the connector 160 has a latch means 167 for preventing inadvertent detachment of the plugs 162 and 164. The front panel status connector is connected to various elements in the front panel such as a speaker (not shown).

Figure 14:
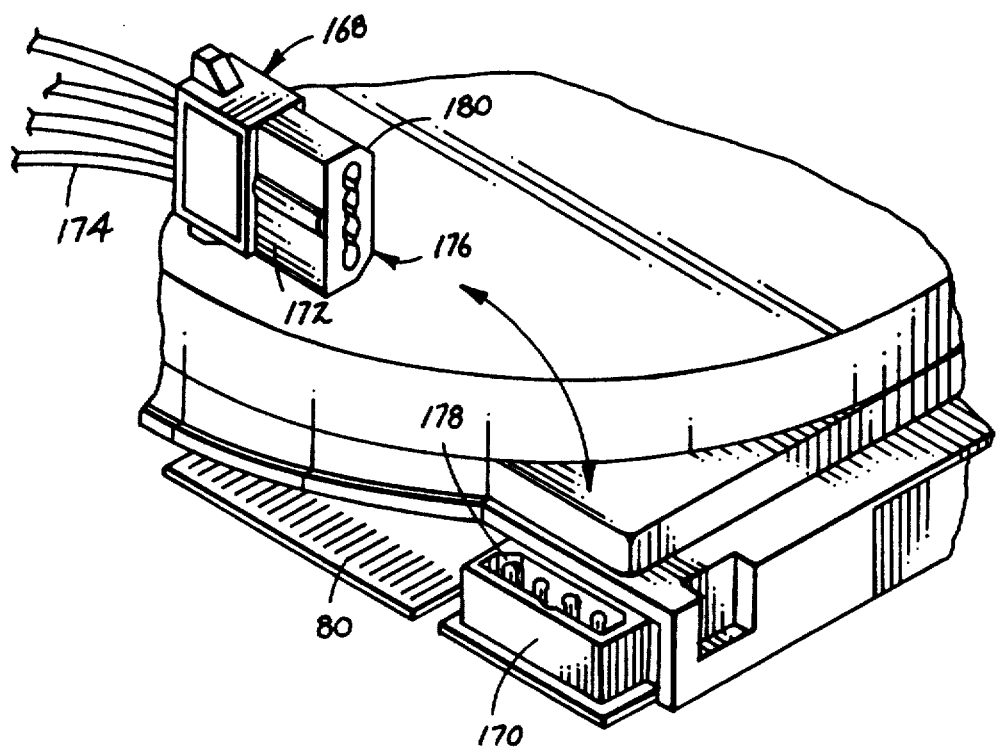
FIG. 14 is an enlarged fragmentary isometric view of a hard disc drive module illustrating a second power supply connector interconnecting the hard disc drive module to the power supply module.

Additionally the computer includes a plurality of disc drive power connectors 168 for operatively interconnecting the power supply module 44 to the disc drive module 72-76. Details of two of the connectors 168 are illustrated in FIGS. 13 and 14. Each connector 168 includes a female socket 170 mounted on the printed board 78 for receiving a male socket plug 172. The socket 72 is affixed to the ends of sets 174 of power supply wires extending from the power supply module 44. The connectors 168 have keying means 176 to prevent improper interconnection of the socket plug 172 in the socket 170. The keying means 176 includes a groove 178 formed in the socket 170 and a projection ridge 180 formed on the socket plug 172 as illustrated in FIG. 13.

Figure 15:
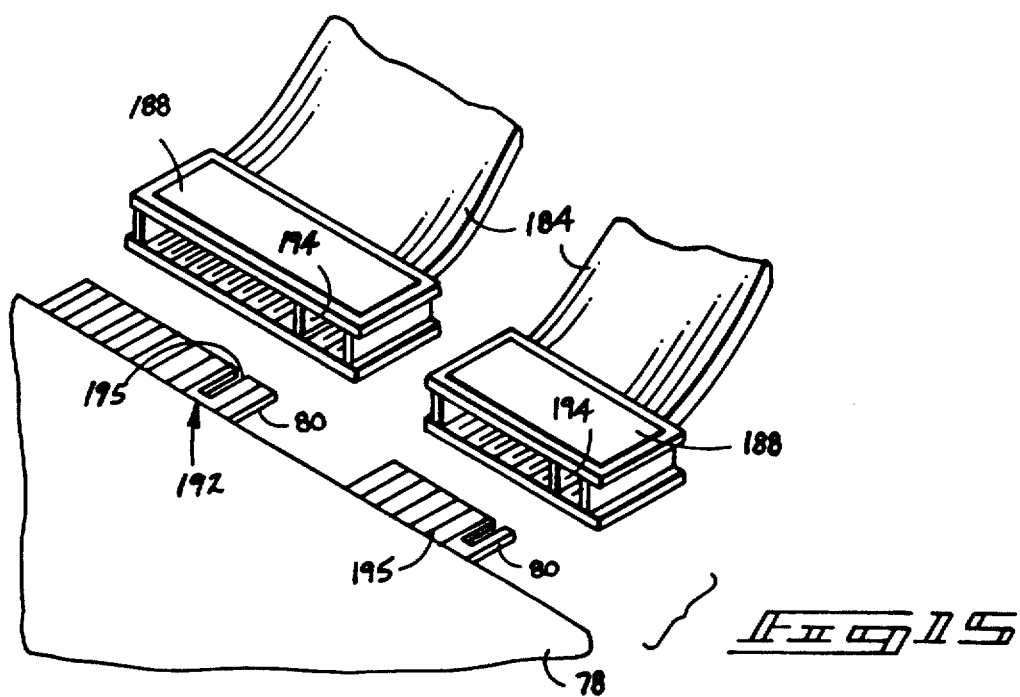
FIG. 15 is an enlarged fragmentary view of control and data signal connectors for interconnecting the hard disc drive module with a disc drive adapter card module.

The computer assembly further includes signal ribbon cables 184 that operatively interconnect the disc drive controller card module 84 with the disc drive module 72-76. Each of the cables 184 has a ribbon connector end element 187 for connecting one end of the ribbon cable 184 to the module 84. An edge connector socket 188 is mounted at the opposite end of each of the ribbon connectors for connecting to one of the disc drive modules 72-76 (FIGS. 5 and 15). Generally if there is more than one disc drive modules 72-76, a second edge connector socket 190 is positioned intermediate to the ends of the ribbon cable 184, to connect to a second edge connector element 80.

Each of the sockets 188 and 190 includes a keying means 192 (FIG. 15) for properly interconnecting the sockets 188 and 190 with their companion male edge connector element 80. The keying means 192 includes a plate 194 inserted in the female edge connector sockets 188 and 190 and a groove 195 cut into the male edge connector element 80 as illustrated in FIG. 15. The keying means 192 enables user to easily remove either a defective disc drive controller card module 84 or defective disc drive module 72-76 and to replace such modules with corresponding modules from the kit 13.

To be able to further assist the user in removing defective modules and to replace the defective modules with "good" modules, the preferred embodiment provides for utilization of coding indices 196, preferably of an alphanumeric (letter-numeral) configuration, on each module to clearly identify the module so that only a replacement module having the same coding indicia is used for replacement. FIG. 16 illustrates a letter coding system for coding each of the modules with a specific letter and numeral so that only corresponding "good" modules having the same coding will be utilized to replace the defective module.

Additionally, with respect to the disc drive controller card module 84 and the video controller card 94, the coding indicia 196 is placed at the appropriate slot 34 so that the user will reinsert the correct module in the appropriate socket 64. The identifying indicia is placed along the upper portion of the rear or back panel 28 immediately above the appropriate slot. For example, in FIG. 4, the disc drive controller card module 84 is designated with the indicia "$D_3$". It should be noted that on the back panel 28, the same "$D_3$" is indicated at the appropriate slot location so that should the present module 84 be defective, the user upon replacement with a "good" module 84 can easily identify the proper slot to which the "good" module 204 is to be inserted.

Further, the computer system 10 includes connector coding indicia 198 placed on the connector elements to enable the user to properly connect the proper connector elements.

The computer system 10 as previously mentioned includes a replacement module kit 13 that contains at a minimum a replacement system board module 200, a replacement hard disc drive module 202, and a replaceable disc drive controller card module 204 and a power supply module 206. Preferably the kit 13 contains a corresponding replacement module for each of the modules of the computer. For example, if the computer had two different hard disc drives such as $H_1$ and $H_2$, then the kit should contain the same replacement modules $H_1$ and $H_2$. If the video monitor module is designated B4, the replacement monitor in the kit 13 should be a B4 monitor.

It is anticipated that not each personal computer will have its own replacement kit 13, but that one replacement kit will service a number of personal computers to greatly reduce the down time of any one computer. After the defective module has been identified and replaced, the defective module may be serviced by a skilled technician at a "service center" or at the "factory" to see if it can be repaired. For example, if the system board module 50 is defective, it will be replaced with a "good" module 200 from the kit 13 and then the defective module 50 may be shipped to a repair facility to diagnose which component of the module is defective and then replace the defective component without having to ship the entire chassis.

Thus it can be seen that the user repairable personal computer assembly 10 is very "user friendly" in enabling the user to remove and replace a defective module with ease and confidence that the correct replacement unit is being installed and that it is being installed in the correct position and connected through the proper connectors.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims appropriately interpreted in accordance with the doctrine of equivalents.

We claim:

1. In a user repairable personal computer,
a main chassis having a rear panel and a front control and display panel;
a system board module removably mounted within the main chassis in which the system board module has (1) an 8-bit or more microprocessor, (2) a plurality of memory integrated circuit elements, (3) a plurality of input/output circuit elements, and (4) a plurality of adaptor card module edge connector sockets;
a power supply module removably mounted within the main chassis for generating DC operating power signals;
a disc drive module removably mounted within the main chassis for transferring data;
a video monitor adapter card module removably mounted within the main chassis in which the video monitor adapter card module has an edge connector removably inserted into one of the edge connector sockets;
a disc drive adapter card module removably mounted within the main chassis in which the disc drive adapter card module has an edge connector removably inserted into another of the edge connector sockets;
wherein the system board module and the power supply module are disconnectably interconnected electrically by a power supply connector that has a power supply connector component affixed to the system board module and a complementary second power supply connector component operatively connected to the power supply module to enable the user to disconnect and reconnect the system board module from the power supply module;
wherein the system board module has a first set of wires having first ends affixed to the system board module and wherein the front panel has a second set of wires having first ends affixed to the front panel and wherein second ends of the first and second sets of wires are disconnectably interconnected electrically by a front panel status connector;
wherein the front panel status connector has complementary male and female mating plugs with keying means for enabling the user to disconnect and reconnect the system board module to the front panel without incorrectly mating the plugs to facilitate the replacement of a defective system board module.

2. In the user repairable personal computer as defined in claim 1 wherein the disconnectable front panel status connector has releasable latching means for preventing the plugs thereof from being unintentionally disconnected.

3. In the user repairable personal computer as defined in claim 1 wherein the disconnectable front panel status connector has at least twelve pins.

4. In the user repairable personal computer as defined in claim 1 wherein the keying means includes a projection formed on one plug and a complementary recess formed in the other plug to receive the projection when the plugs are properly mated and to prevent improper mating.

5. In the user repairable personal computer as defined in claim 1 wherein the disconnectable power supply connector has a keying means for enabling the user to disconnect and reconnect the detachable power supply connector without incorrectly mating the connector components.

6. In the user repairable personal computer as defined in claim 1 wherein the disconnectable power supply connector has at least twelve pins.

7. In the user repairable personal computer as defined in claim 1 wherein the power supply module and the front panel are disconnectably interconnected electrically by a front panel power connector that has a plug element connected to a third set of wires extending from the power supply module and a complementary plug element connected to a fourth set of wires connected to the front panel to facilitate the removal and replacement of the power supply module from within the main chassis.

8. In the user repairable personal computer as defined in claim 7 wherein the front panel power connector has a keying means for enabling the user to disconnect and reconnect the front panel power indicator connector without incorrectly mating the plug elements when the power supply module is being removed and replaced.

9. In the user repairable personal computer as defined in claim 7 wherein the front panel power connector has latching means for preventing the unintentional disconnection of the front panel power connector.

10. In the user repairable personal computer as defined in claim 1 wherein the system board module has a plurality of dual-in-line integrated circuit pin sockets and wherein a plurality of the integrated circuits elements have dual-in-line pins that are removably mounted in the sockets to enable defective integrated circuit elements to be removed from the system board module after the system board module has been disconnected and removed from within the main chassis.

11. In the user repairable personal computer as defined in claim 1 wherein the disc drive module includes a disc drive printed circuit board and wherein the power supply module and the disc drive module are disconnectably interconnected electrically by disc drive power connector in which the disc drive power connector has a female socket affixed to the disc drive printed circuit board and a male plug affixed to the ends of a set of power wires extending from the power supply module and wherein the disc drive power connector has keying means to enable the user to disconnect and reconnect either the power supply module or the disc drive module without incorrectly mating the female socket and the male plug to facilitate the replacement of either a defective power supply module or a defective disc drive module.

12. In a user repairable personal computer as defined in claim 11 wherein the disc drive power connector keying means includes a key groove formed in the female socket and a corresponding groove projection formed on the male plug to prevent incorrect mating.

13. In a user repairable personal computer as defined in claim 1 wherein each of the modules is coded with a different alphanumeric designation and wherein correct locations of the modules within the main chassis are coded with corresponding alphanumeric designations to enable the user to replace a module in its correct locations by observing the alphanumeric designations.

14. In a user repairable personal computer as defined in claim 1 wherein each of the connectors have coded indicia thereon to enable the user to correctly reconnect the proper connectors.

15. In a user repairable personal computer as defined in claim 1 wherein the microprocessor is selected from a group consisting of a 8088 microprocessor family, a 80286 microprocessor family, a 80386 microprocessor family and a 80486 family.

16. In the user repairable personal computer as defined in claim 1 wherein the disc drive module includes a printed circuit board with a male edge connector element formed thereon and wherein the disc drive module and the disc drive adapter card module are disconnectably interconnected by a ribbon connector having a female edge connector element at one end thereon for disconnectably receiving the male edge connector element and wherein the male edge connector element and the female edge connector element have keying means for preventing improper mating of the edge connector elements when a defective disc drive module is replaced.

17. In the user repairable personal computer as defined in claim 1 comprising a kit of replacement modules for enabling the user to disconnect and remove a defective module and replace the defective module with a replacement module from the kit.

18. In the repairable personal computer as defined in claim 17 wherein each of the modules in the kit has coded indices therein that correspond to coded indices on the modules within the chassis to enable user to correctly exchange a replacement module for a defective module.

19. In a user repairable personal computer system,
a main chassis having a rear panel and a front control and display panel;
a system board module removably mounted within the main chassis in which the system board module has (1) an 8-bit or more microprocessor, (2) a plurality of memory integrated circuit elements, (3) a plurality of input/output circuit elements, and (4) a plurality of adaptor card module edge connector sockets;
a power supply module removably mounted within the main chassis for generating DC operating power signals;
a disc drive module replaceably mounted within the main chassis for transferring data;
a video monitor adapter card module removably mounted within the main chassis in which the video monitor adapter card module has an edge connector removably inserted into one of the edge connector sockets;
a disc drive adapter card module removably mounted within the main chassis in which the disc drive adapter card module has an edge connector removably inserted into another of the edge connector sockets;
a replacement kit containing a replacement system board module, a replacement disc drive module, a replacement disc drive adapter card module and a replacement power supply module;
wherein the system board module and the power supply module are disconnectably interconnected electrically by a power supply connector that has a power supply connector component affixed to the system board module and a complementary power supply connector component operatively connected to the power supply module to enable the user to disconnect a defective system board module or defective power supply module and replace the defective system board module with the replacement system board module or the replacement power supply module;
wherein the power supply connector includes a first keying means for preventing the power supply connector components from being improperly mated;
wherein the system board module and the front panel are disconnectably interconnected electrically by a front panel control connector;
wherein the front panel control connector has complementary male and female mating plugs with keying means for enabling the user to disconnect a defective system board module from the front panel and replace the defective system board module with the replaceable system board module without incorrectly mating the plugs to facilitate the replacement of a defective system board module.

20. In the user repairable personal computer as defined in claim 19 wherein the system board module has a first set of wires having first ends affixed to the system board module and wherein the front panel has a second set of wires having first ends affixed to the front panel and wherein second ends of the first and second sets of wires are disconnectably interconnected electrically by a front panel control connector;
wherein the front panel control connector has complementary male and female mating plugs with second keying means for enabling the user to disconnect and reconnect the system board module to the front panel without incorrectly mating the plugs;
wherein the disconnectable front panel control connector has releasable latching means for preventing the plugs thereof from being unintentionally disconnected.

21. In the user repairable personal computer as defined in claim 19 wherein the disconnectable front panel control connector has at least twelve pins.

22. In the user repairable personal computer as defined in claim 19 wherein the system board module has a first set of wires having first ends affixed to the system board module and wherein the front panel has a second set of wires having first ends affixed to the front panel and wherein second ends of the first and second sets of wires are disconnectably interconnected electrically by the front panel control connector;
   wherein the second keying means includes a projection formed on one plug and a complementary recess formed in the other plug to receive the projection when the plugs are properly mated and to prevent improper mating.

23. In the user repairable personal computer as defined in claim 19 wherein the disconnectable power supply connector has a least twelve pins.

24. In the user repairable personal computer as defined in claim 19 wherein the power supply module and the front panel are disconnectably interconnected electrically by a front panel power connector having a plug element connected to a set of wires extending from the power supply module and a complementary plug element connected to a set of wires connected to the front panel to facilitate the removal of a defective power supply module and replacement with the replaceable power supply module.

25. In the user repairable personal computer as defined in claim 24 wherein the front panel power connector has a keying means for enabling the user to disconnect and reconnect the power indicator connector without incorrectly mating the plug elements when the power supply module is being removed and replaced.

26. In the user repairable personal computer as defined in claim 24 wherein the front panel power connector has latching means for preventing the unintentional disconnection of the power indicator connector.

27. In the user repairable personal computer as defined in claim 19 wherein the system board module has a plurality of dual-in-line integrated circuit pin sockets and wherein a plurality of the integrated circuits elements have dual-in-line pins that are removably mounted in the sockets to enable defective integrated circuit elements to removed from the system board module after the system board module has been disconnected and removed from within the main chassis.

28. In the user repairable personal computer as defined in claim 19 wherein the disc drive module includes a disc drive printed circuit board and wherein the power supply module and the disc drive module are disconnectably interconnected electrically by disc drive power connector in which the disc drive power connector has a female socket affixed to the disc drive printed circuit board and a male plug affixed to the ends of a set of power wires extending from the power supply module and wherein the disc drive power connector has a keying means to enable the user to disconnect and reconnect either the power supply module and the disc drive module without incorrectly mating the female socket and the male plug to facilitate the replacement of either a defective power supply module or defective disc drive module.

29. In a user repairable personal computer as defined in claim 28 wherein the disc drive power connector keying means includes a key groove formed in the female socket and a corresponding groove projection formed on the male plug to prevent incorrect mating.

30. In a user repairable personal computer as defined in claim 19 wherein each of the modules are coded with a different alphanumeric designation and wherein each of the replacement modules is coded with corresponding alphanumeric designations to enable the user to easily exchange a replaceable module for a corresponding defective module.

31. In a user repairable personal computer as defined in claim 19 wherein each of the connectors have coded indicia thereon to enable the user to correctly reconnect the proper connectors after the defective module has been replaced.

32. In a user repairable personal computer as defined in claim 19 wherein the microprocessor is selected from a group consisting of a 8088 microprocessor family, a 80286 microprocessor family, a 80386 microprocessor family and a 80486 microprocessor family.

33. In the user repairable personal computer as defined in claim 19 wherein the disc drive module includes a printed circuit board with a male edge connector element formed thereon and wherein the disc drive module and the disc drive adapter card module are disconnectably interconnected by a ribbon connector having a female edge connector element at one end thereon for disconnectably receiving the male edge connector element and wherein the male edge connector element and the female edge connector element have keying means for preventing improper mating of the edge connector elements when a defective disc drive module is replaced.

* * * * *